United States Patent [19]

Marino

[11] Patent Number: 5,347,515
[45] Date of Patent: Sep. 13, 1994

[54] METHOD AND APPARATUS FOR GLOBAL POLLING HAVING CONTENTION-BASED ADDRESS IDENTIFICATION

[75] Inventor: Francis C. Marino, Dix Hills, N.Y.

[73] Assignee: Pittway Corporation, Syosset, N.Y.

[21] Appl. No.: 859,070

[22] Filed: Mar. 27, 1992

[51] Int. Cl.$^5$ .............................................. H04Q 11/04
[52] U.S. Cl. .................................. 370/85.2; 370/85.6;
370/85.8; 370/85.15; 340/825.05; 340/825.08;
340/825.5; 340/825.51
[58] Field of Search .................... 370/85.2, 85.6, 85.15,
370/95.2, 85.8; 340/825.05, 825.07, 825.08,
825.5, 825.51, 825.52

[56] References Cited

U.S. PATENT DOCUMENTS

| 4,466,001 | 8/1984 | Moore et al. | 340/825.08 |
| 4,658,243 | 4/1987 | Kimura et al. | 340/825.08 X |
| 4,768,189 | 8/1988 | Gopanith et al. | 340/825.5 X |
| 5,089,974 | 2/1992 | Demeyer et al. | 340/825.07 X |

FOREIGN PATENT DOCUMENTS 1365838 9/1974 United Kingdom .......... G06F 3/00

OTHER PUBLICATIONS

Brochure–Cherry Semiconductor, "Security Detector Data Receiver/Transmitter", 3 pages.

Primary Examiner—Douglas W. Olms
Assistant Examiner—Russell W. Blum
Attorney, Agent, or Firm—Ladas & Parry

[57] ABSTRACT

A plurality of serially addressable devices connected to transmit data to or from a central controller via a two-wire polling loop has a global poll capability. The transmissions of data are via a tri-level line signal to provide both power and data transmission on a two-wire line. Global polling is initiated by a preamble recognized by each device in the loop. The preamble is followed by a single bit sequence to allow the devices to signal the central controller that one or more devices will respond to the global poll. If one or more devices will respond to the global poll, a series of bit sequences is generated by the central controller equal to the number of bits that will be transmitted by the serially addressable device to transmit its address and status. In order that only a single device respond to a global poll, if two or more devices are in contention for control of the loop to transmit their message to the central controller, each device measures the voltage on the loop and drops out of contention if it measures a digital zero while it is trying to transmit a digital one in the address field.

10 Claims, 4 Drawing Sheets

METHOD AND APPARATUS FOR GLOBAL POLLING HAVING CONTENTION-BASED ADDRESS IDENTIFICATION

BACKGROUND OF THE INVENTION

This invention generally relates to a polling technique for a plurality of devices connected together by a two-wire loop. More specifically, it relates to a global polling technique for a plurality of devices in a security system in which the devices are coupled together by a two-wire loop.

Security systems may comprise a plurality of devices which are coupled together via a wire link. In simple security systems, these devices may be magnetic or mechanical switches or other well known devices which either open or close a connection on the line. However, in more sophisticated systems, each point of a multi-point security system is assigned an address and communicates its response to a central controller along with the address so that the location of the intrusion in known. Such security systems may employ lengthy loops of wire to couple the devices to the central controller, with a length of several thousand feet being a typical maximum for each loop. Accordingly, minimalization of the number of wires in the loop is desirable in order to minimize the wire costs associated with the wire loops.

Serially addressable receiver/transmitter circuits are known which can transmit and receive data between points in the loop and a central controller along the same lines which are also utilized to transmit power. The devices typically utilize a three-level line signal, as shown as signal 100 in FIG. 1. The signal typically comprises a high voltage level, a reference voltage level, and a third logic level in between the first two levels. The circuit rectifies and filters the high level on the line in order to obtain power for the circuitry. The devices may be typically embodied in a single integrated circuit such as model CS-212 manufactured by Cherry Semiconductor. The devices known in the art utilize a unit poll. That is, an address is sent via a central controller along the wire loop. This is contiguously followed by a series of bit sequences corresponding to logic ones, for example, having a length equal to the number of bits in a message expected to be received from one of the serially addressed devices. The serially addressed device in the loop having the corresponding address is activated by the address on the line and responds by modifying the bit sequences that follow the address so as to transmit a message to the controller. If the bit in the bit sequence that is being transmitted by the controller is desired to be a logic one, for example, the serially addressable device would not change the bit and thus a one would be transmitted to the controller. If it was desired that the bit actually represent a zero, the serially addressable device would place a low impedance across the line in order to force the voltage on the line to a zero, thus transmitting a zero to the controller.

In loops operating on this principle, it is necessary that the controller periodically sequence through all of the addresses of the devices on the loop in order to obtain new messages from each of the devices. In a multi-point security system, the data on the loop can represent an intrusion, an ARMING or DISARMING of the system, a failure within the system or the need to change a battery at one of the points, for example. It is thus necessary that the polling take place so that each device is addressed within a relatively short interval, so that these actions can take place in real time. As the number of devices in the loop increases, it is also necessary to increase the number of bits in the address. Furthermore, an addressing scheme that can be utilized employs an Applications Specific integrated circuit (ASIC) that, in addition to the function that it performs in the security system, is programmed with a unique serial number. The type of functions performed by the ASIC, such as a security detector data receiver/transmitter, for example, are well known in the art and need not be discussed in detail here. In fact, depending upon the use of the ASIC, various functions may be provided on the chip. In addition, thereto, the integrated circuit is provided with a unique serial number. In this scheme, 22 serial number bits are provided. When the ASIC is in the wafer stage of its manufacturing cycle, the chips are tested and malfunctioning chips are marked for eventual deletion by automatic test equipment. The remaining chips which are acceptable are then made to undergo an additional operation in accordance with this scheme. The 22 serial number bits are uniquely configured in a sequential manner for each "good" chip starting with the serial number 0 to a number corresponding to the actual number of chips to be fabricated for a given order. For example, the first 10,000 chips will be numbered sequentially from 0–9,999. Subsequent manufacturing runs of this chip will start from the next available number and continue for the number of chips required in that manufacturing run. The utilization of 22 bits yields $2^{22}$ or 4.2 million unique combinations. This provides a very low probability of repeating numbers occurring in the same general area within the physical range of a wireless system or within the same wired system. An advantage of this scheme is that the user need not enter a multi-digit code in order to activate the security system either to arm or disarm the system or to perform another function. The code is transmitted automatically. A further advantage is that each part has a unique number, which has been preprogrammed at the factory. Thus, neither the user nor the installer need know the unique number. The microprocessor control controller 334 is simply informed that a particular user, for example assigned as user 1, is to be associated with a unique serial number which is then entered into the computer via activation of the ASIC. Once the identification number, for example 1, and the parameters are entered into the computer, the sensor can be activated to trigger the ASIC to transmit its unique serial number to the computer, which will then "memorize" the unique serial number associated with that newly programmed sensor. Again, this can be accomplished without the installer having knowledge of the unique serial number and avoids the difficulties in programming such numbers found in the prior art. Thus increases in the number of bits in the address and increases in the number of devices on a single polling loop exacerbate the problem of the need to poll each device via a unit poll within a short enough cycle so that the system can operate in real time.

SUMMARY OF THE INVENTION

It is a general object of the present invention to provide a method and apparatus for global polling serially addressable devices in a two-wire loop and to provide a device for use in two-wire loops which responds to global polling.

It is a further object of the invention to provide a global polling technique for security systems in which each point of the security system is coupled to a central controller via a two-wire loop.

These and other objects, advantages and features are achieved by a method of global polling in a loop having a plurality of serially addressable devices each having a unique address and being coupled to each other by a pair of wires, in which data is transferred from or to each device by means of a multi-voltage level line signal generated by a central controller. A preamble signal is transmitted from said central controller for instituting global polling. A plurality of bit sequences corresponding to a number of bits in an address for each device plus a number of bits in a message are transmitted from the central controller. Each device in contention by responding to the poll by its address identifies itself. The self-identification step comprises providing a low impedance across output terminals of the device when an address bit is a first logic state and providing a high impedance across the output terminals when an address bit is a second state. The voltage level on the loop by each device in contention is monitored. The self-identification step by a device ceases if, when the device provides said second logic state at the output terminals, the monitoring step indicates a voltage level corresponding to said first logic state on the loop.

A further aspect of the invention comprises a loop having a plurality of serially addressable devices each having a unique address and being coupled to each other by a pair of wires, in which data is transferred from or to each device by means of a multi-voltage level line signal generated by a central controller. Means in the central controller transmits a preamble signal for instituting global polling. Means in the central controller transmits a plurality of bit sequences corresponding to a number of bits in an address for each device plus a number of bits in a message. Identifying means in each device in contention by responding to the poll identifies each device by its address, the identifying means comprises means for providing a low impedance across output terminals of the device when an address bit is a first logic state and means for providing a high impedance across the output terminals when an address bit is a second state. Means monitors the voltage level on the loop by each device in contention. Means in the identifying means terminates output of the device address if, when the device provides the second logic state at the output terminals, the monitoring means indicates a voltage level corresponding to the first logic state on the loop.

Yet another aspect of the invention includes a serially addressable device having a unique address for being coupled to other such devices by a two-wire loop in which data is transferred to or from each device by means of a multi-voltage level line signal generated by a central controller for the loop. Starting means responsive to a preamble signal institutes global polling. Address means responsive to the starting means and a series of bit sequences from the central controller outputs a plurality of bits representing the unique address of said device. The address means comprises driver means for providing a low impedance across output terminals of the device when one of the address bits is a first logic state and for providing a high impedance across the output terminals when the address bit is a second logic state. Monitoring means coupled to the loop monitors the voltage level on the loop during each bit sequence. Stopping means responsive to the monitoring means ceases output of address bits by the driver means if the driver means provides the second logic state at the output terminals and the monitoring means indicates a voltage level on the loop corresponding to the first voltage level.

DETAILED DESCRIPTION

Figure 1:
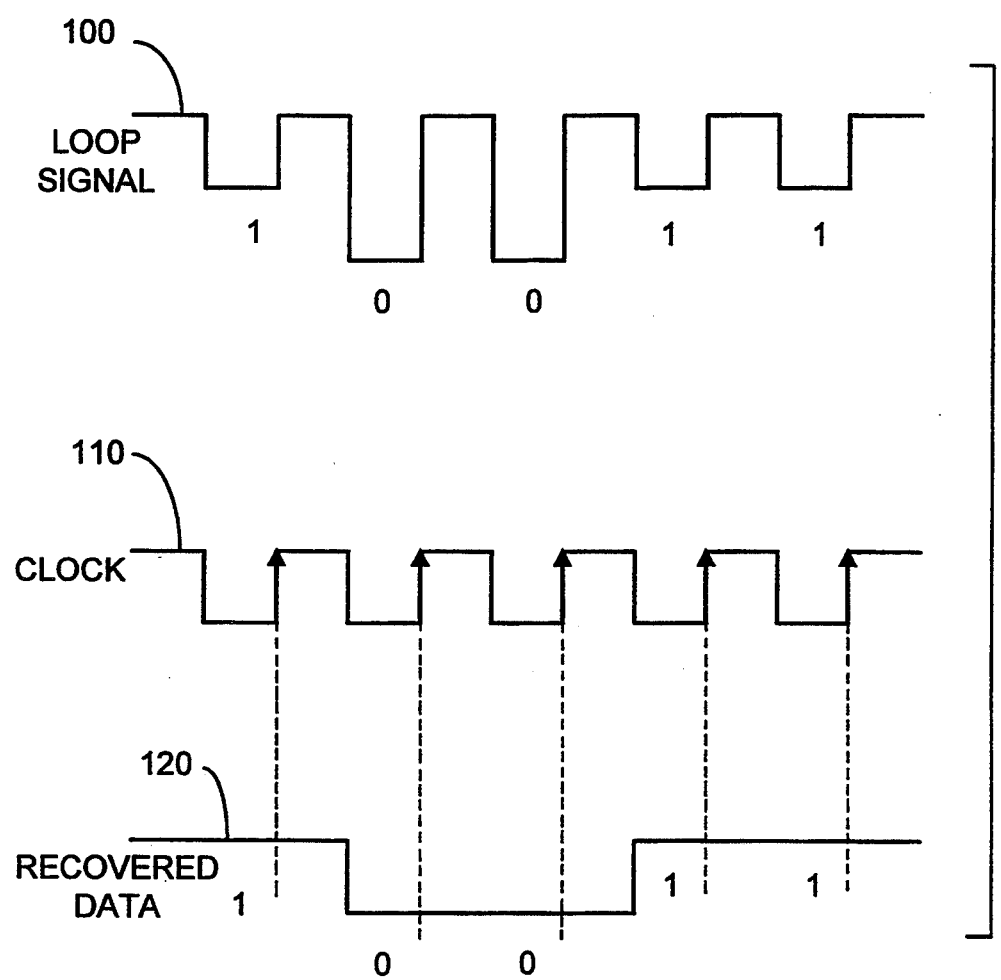
FIG. 1 illustrates a three-level line signal known in the art.
Figure 3:
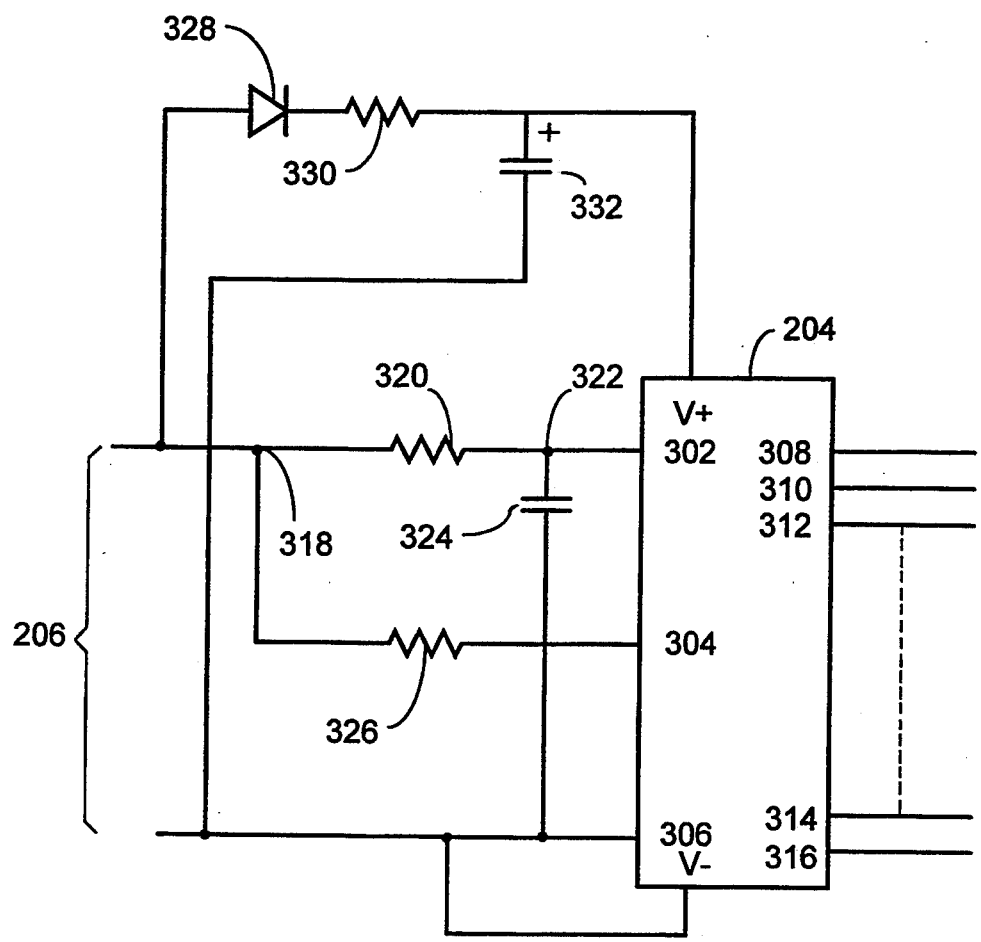
FIG. 3 illustrates the connection of a serially addressed device to the polling loop in accordance with the present invention.

FIG. 1 illustrates a known tri-level line signal for use in two-wire loop systems. In the known system, a high level signal is utilized to transmit power, a digital zero is transmitted by a voltage substantially at zero volts and digital one is transmitted at the third level, which is current limited and typically half way between the high level voltage and zero. It is known to utilize 15 volts for the high level signal, zero volts to transmit a digital zero and 7.5 volts to transmit a digital one. In FIG. 1, signal 100 represents the signal on the loop and the data bits that the signal represents are illustrated below the signal. The signal can be decomposed into a clock signal shown as signal 110 and the recovered data component shown as signal 120. A logic one is indicated by a half maximum voltage and a logic zero by a minimum voltage during the first half of any bit interval. Operating power for the circuit can be obtained through a forward biased series diode utilized to charge a capacitor in parallel with the serially addressed device while the waveform is at maximum voltage during the second half of any bit interval. This is shown in FIG. 3 in which diode 328, resistor 330 and capacitor 332 comprise a rectifier-filter circuit. During the first half of the bit interval, the diode 328 is reversed biased and the capacitor 332 supplies power to the serially addressed device. Resistor 330 limits the maximum instantaneous charging current to capacitor 332. The waveform is decomposed through the use of data comparators having thresholds of 75% and 25% of the power supply voltage, respectfully.

Data is transmitted to the serially addressed device by means of waveform 100. For data to be transmitted from the serially addressed device to the controller, the controller provides a series of digital ones which may be allowed to remain digital ones or reduced to substantially zero volts to transmit a digital zero. The voltage can be reduced to substantially zero volts by placing a low impedance across the loop for that portion of the bit interval, during which time the current is limited at the controller.

Figure 2:
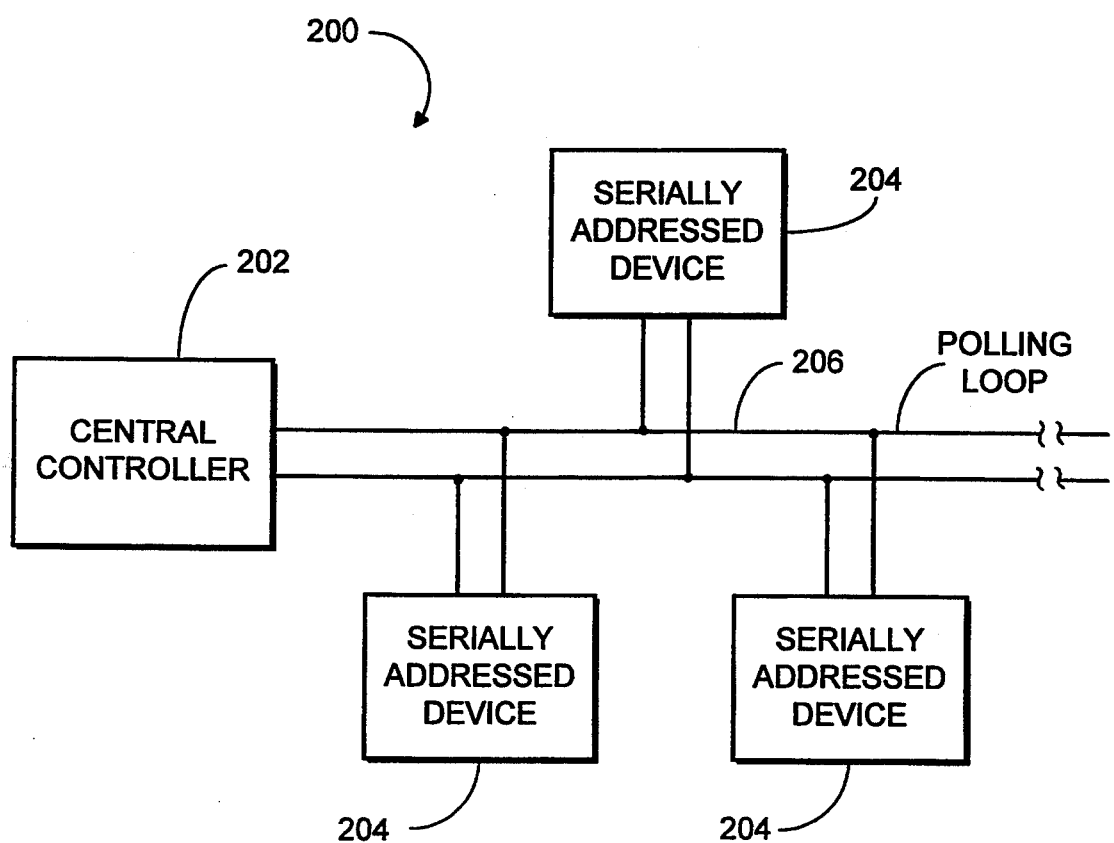
FIG. 2 illustrates a plurality of serially addressable devices coupled to a polling loop and a central controller in accordance with the present invention.

FIG. 2 illustrates a security system 200 in which a central controller 202 is coupled to three serially addressed devices 204 via a two-wire loop 206. The devices 204 need not be identical provided they utilize the same communications module to communicate along the polling loop. Thus, the serially addressed device can be placed within devices utilized in a multi-point security system, for example. These devices can be contact switches, key switches, keypads, PIR detectors or smoke detectors, for example.

FIG. 3 illustrates the connection of one of the serially addressed devices 204 to the loop 206. In the polling loop 206, one of the conductors is kept at ground potential and the other conductor carries the tri-level signal. The conductor maintained at ground potential is coupled to input 306 of device 204. The conductor of loop 206 which carries the tri-level signal is coupled to input 302 through series resistor 320 and parallel capacitor 324. The capacitor is coupled between node 322 between the resistor 320 and input 302 and the ground input 306. Resistor 320 and capacitor 324 form a resistor-capacitor integrator, as is well known to those skilled in the art. The purpose of the integrator is to reduce the effects of noise on the line. A second resistor 326 is coupled from output 304 to a node 318 between the polling loop 206 and resistor 320.

In operation, the tri-level signal is detected at input 302 and the signal disassociated as described above in order to recover the data. If the device 204 is to transmit a signal to the controller 202, this is done via output 304. The controller 202 provides a signal on loop 206 which comprises a plurality of digital ones, with the number of bits corresponding to the number of bits to be transmitted by device 204. If device 204 intends to transmit a digital one, output 304 is maintained at a high impedance and the signal on the loop is unaffected. In order to transmit a digital zero, output 304 is reduced to a very low impedance which places resistor 326 across the loop, thus reducing the voltage on the loop to substantially zero volts. Resistor 326 has a substantially lower resistance than resistor 320. The signal at node 318 can be measured at input 302 to determine if the desired result, that is the transmission digital one or a digital zero, is achieved.

Device 204 may be provided with a series of inputs 308, 310, 312, 314, 316 for inputting an address from a plurality of DIP switches (not shown), for example. These switches can be utilized to set the address of the device 204 in a manner known to those skilled in the art. Alternatively, the address may be set in accordance with the ASIC addressing scheme described above.

Figure 4:
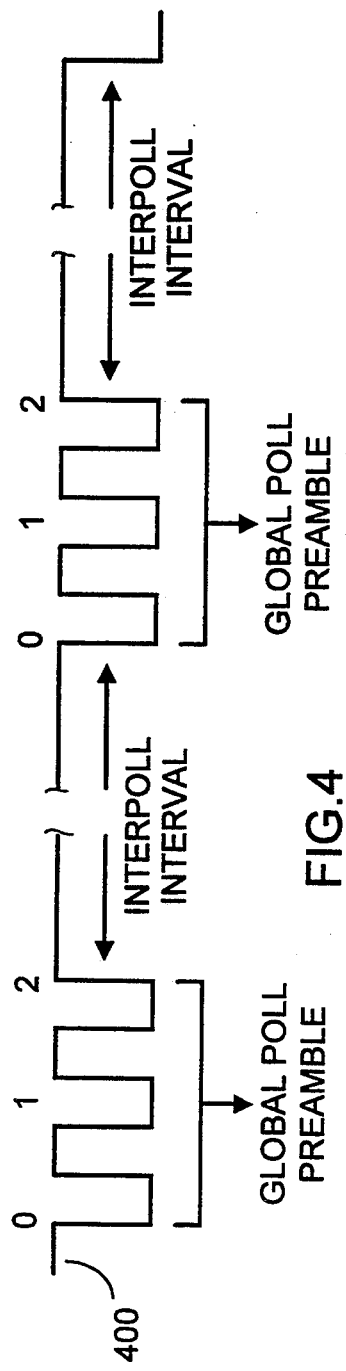
FIG. 4 is a timing diagram for the waveform on the polling loop in which no units respond to the global poll.

A global polling technique for utilization in the system 200 will now be described in connection with FIGS. 4 and 5. FIG. 4 illustrates a global poll in which none of the devices responds. A global always starts with the global poll preamble which comprises two digital ones labelled 0 and 1 in FIG. 4 which indicates to all of the devices in the loop that a global poll is to take place. This is followed by a third digital one labelled 2 in FIG. 4 which is utilized to communicate to the central controller that one or more of the devices 204 wishes to respond to the poll. If one of the devices wishes to respond to the poll, it will take its output 304 low during this interval to place its resistor 326 across the loop and thus transmit a digital zero to the controller. As illustrated in FIG. 4, none of the devices in the loop are responding to the poll so the third digital one, labelled 2 in FIG. 4 is not reduced to a digital zero. The central controller 202 recognizes that none of the devices has responded to the global poll and takes no further action during the inter-poll interval illustrated in FIG. 4. The length of this interval is determined according to the needs of the system, which includes the need to provide data to other parts of the system in real time. Each of the devices 204 would contain one or more latches (not shown) that store a change in the status at that point in the system. A latch may be provided for each element of the status of that particular point. This can include intrusion, ARMING or DISARMING the system, a failure of a component at that point or the need to replace a battery, for example. If none of the status latches have been set for that particular point, there is no need for the device 204 to respond to the poll and there is no need for controller 202 to update any of the information regarding that point. Thus, if there is no change in status of any of the points on the loop, it is unnecessary for the central controller 202 to proceed through a unit poll of each device on the loop in order to reach this determination, as required in the prior art.

Figure 5:
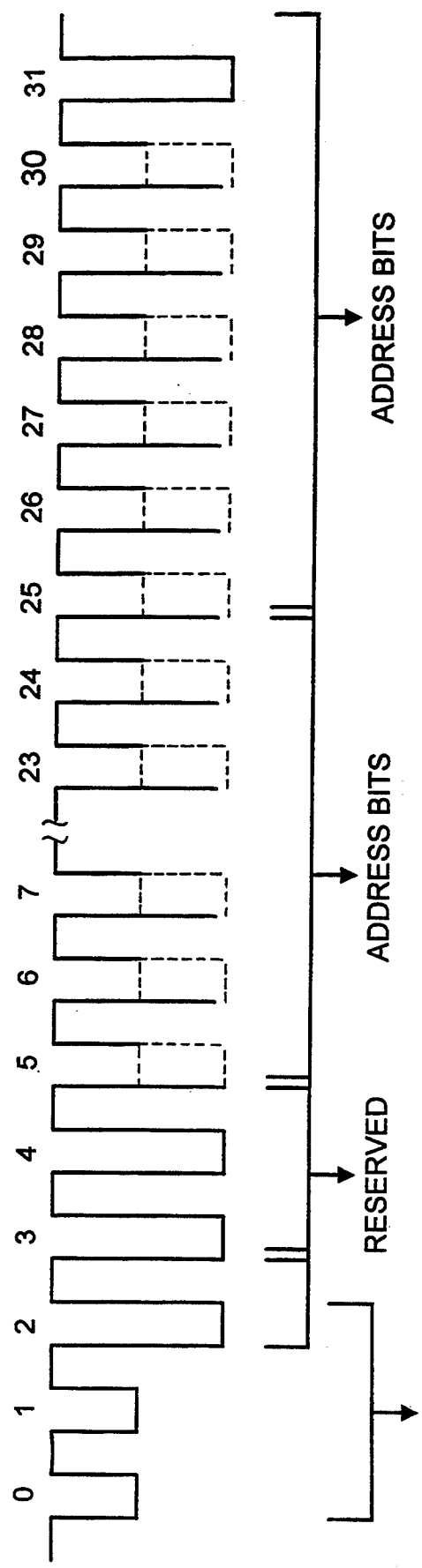
FIG. 5 is a timing diagram of the waveform on the polling loop in which at least one of the serially addressed devices responds to the global poll.

FIG. 5 illustrates the condition where one or more of the devices responds to the global poll. In this case the third bit of the global poll sequence, labelled 2 in FIG. 5, has been brought to substantially zero volts by one or more of the devices 204 in the loop. This transmits a digital zero to the central controller 202 to start the sequence for receiving a message from the device or devices in the loop which wish to transmit a change in status to the central controller. One characteristic of a global poll, is that it is not known whether there is more than one device which wishes to transmit to the central controller as it is not possible to transmit data from more than one device during any global poll.

The central controller follows the preamble in which the third bit has been reduced to zero with a series of bit sequences equal to the number of bits in the address and status fields of the device. As shown in FIG. 5, there are twenty address bits and seven status bits plus two bits labelled 3 and 4 which are reserved for other purposes. Thus, the preamble would be followed by a series of twenty nine bit sequences. The bit sequences comprise digital ones produced by the central controller. If the device responding to the global poll is to transmit a digital one, its output 304 is maintained at a high impedance state and no change is made to the digital one, thus transmitting a digital one back to the controller. If it is desired to transmit a digital zero, output 304 is brought to a low impedance state which places resistor 326 across the loop in order to reduce the digital one transmitted by the controller to substantially zero volts which transmits a digital zero to the controller.

If more than one device 204 responds to the global poll, the devices that respond are said to be in contention for the right to respond to the global poll. In view of the fact that only one device can respond to a given global poll, the device monitors the voltage on the loop through input 302 as it transmits its address back to the central controller. If a particular device is transmitting a digital one to the central controller but another device is transmitting a digital zero to the central controller, the digital zero will dominate over the digital one because the value of the resistors 326 and the limiting current provided by the controller have been chosen such that even a single resistor will provide a voltage of substantially zero volts on the loop. Thus, the device will monitor a zero volt level at input 302 although its output 304 was maintained at a high impedance state. In this case that particular device 204 would cease responding to the poll thereby yielding the right to respond to the poll to the device which has a lower binary address.

For example, assume three devices having the following addresses:
Device 1 00,0000,0000,0100,0011,0011
Device 2 00,0000,1000,0000,0110,1101
Device 3 00,0000,0000,0000,0001,1110

The first difference between the addresses of the three devices occurs in the seventh bit. The first and third devices each have a zero in this bit whereas the second device has a digital one. Therefore, the second device will maintain its output 304 in a high impedance state during this bit interval whereas the other two devices will maintain their outputs 304 at a low impedance thus placing two resistors 326 across the loop. Accordingly, the voltage across the loop will drop to substantially zero volts thereby transmitting a digital zero to the controller. The second device 204 will detect a digital zero on the loop at its input 302 although it was attempting to transmit a digital one. It will therefore drop out of contention after the seventh transmitted address bit. The next change occurs in the twelfth address bit in which the first device would be transmitting a digital one whereas the third device would be transmitting a digital zero. Accordingly, the first device will drop out of contention and cease transmitting after the twelfth bit. The result is that the loop will be yielded to the third digital device which has the lowest binary address and which corresponds to the highest priority in this scheme. The third device will therefore continue transmitting the remainder of its address and then its status bits to the central controller.

After the global poll has been completed, the signal is returned to the high level state until it is time for another global poll or for a unit poll. During this inter-poll interval, the devices will be reset so that it can properly proceed during the next polling sequence.

While a particular embodiment of the present invention has been disclosed herein, it will be obvious to those skilled in the art that certain changes and modifications can be made, which changes are included within the scope of the present invention. All such changes and modifications can be made without departing from the invention as defined by the appended claims.

I claim:

1. A method of global polling in a loop having a plurality of serially addressable devices each having a unique address and being coupled to each other by a pair of wires, in which data is transferred from or to each device by means of a multi-voltage level line signal generated by a central controller, said method comprising:
   transmitting from said central controller a preamble signal for instituting global polling;
   transmitting from said central controller a plurality of bit intervals corresponding to a number of bits in an address for each device plus a number of bits in a message;
   self-identification by each device in contention for responding to said central controller, where any of said devices in said loop can respond to the poll and where said central controller does not know the addresses of the devices that will respond to the poll prior to the self-identification step, said self-identification step comprising providing a low impedance across output terminals of said device when an address bit is a first logic state and providing a high impedance across said output terminals when an address bit is a second logic state;
   monitoring the voltage level on said loop by each device in contention;
   ceasing said self-identification step by a device if, when said device provides said second logic state at said output terminals, said monitoring step indicates a voltage level corresponding to said first logic state on said loop.

2. The method according to claim 1 wherein said first logic state is a digital 0 and said second logic state is a digital 1.

3. The method according to claim 1 wherein said preamble signal includes a bit sequence for transmitting a signal to said central controller indicating that at least one device will respond to the poll.

4. The method according to claim 3 wherein said preamble comprises two digital ones followed by said bit sequence.

5. In a loop having a plurality of serially addressable devices each having a unique address and being coupled to each other by a pair of wires, in which data is transferred from or to each device by means of a multi-voltage level line signal generated by a central controller, apparatus for global polling said devices comprising:
   means in said central controller for transmitting a preamble signal for instituting global polling;
   means in said central controller for transmitting a plurality of bit intervals corresponding to a number of bits in an address for each device plus a number of bits in a message;
   self-identifying means in each device in contention for responding to said central controller for identifying each device by said unique address, wherein any of said devices in said loop can respond to the poll and wherein said central controller does not know the addresses of the devices that will respond to the poll prior to said identification of each device by its unique address, said self-identifying means comprising means for providing a low impedance across output terminals of said device when an address bit is a first logic state and means for providing a high impedance across said output terminals when an address bit is a second logic state;
   means for monitoring the voltage level on said loop by each device in contention;
   means in said self-identifying means for terminating output of said device address if, when said device provides said second logic state at said output terminals, said monitoring means indicates a voltage level corresponding to said first logic state on said loop.

6. Apparatus according to claim 5 wherein said first logic state is a digital 0 and said second logic state is a digital one.

7. Apparatus according to claim 5 wherein said preamble signal includes a bit sequence for transmitting a signal to said central controller indicating that at least one device will respond to the poll.

8. Apparatus according to claim 7 wherein said preamble comprises two digital ones followed by said bit sequence.

9. In a serially addressable device having a unique address for being coupled to other such devices by a two-wire loop in which data is transferred to or from each device by means of a multi-voltage level line signal generated by a central controller for said loop, means for global polling comprising:

starting means responsive to a preamble signal for instituting global polling address means responsive to said starting means and a series of bit intervals generated by said central controller for generating a plurality of bits representing the unique address of said device, where any of said devices in said loop can respond to the poll and where said central controller does not know the addresses of the devices that will respond to the poll prior to the generation of said unique address, said address means comprising driver means for providing a low impedance across output terminals of said device when one of said address bits is a first logic state and for providing a high impedance across said output terminals when said address bit is a second logic state;

monitoring means coupled to said loop for monitoring the voltage level on said loop during each bit sequences;

stopping means responsive to said monitoring means for ceasing generation of address bits by said driver means if said driver means provides said second logic state at said output terminals and said monitoring means indicates a voltage level on said loop corresponding to said first voltage level.

10. The device according to claim 9 wherein said first logic state is a digital 0 and said second logic state is a digital one.

* * * * *